United States Patent
Qiu et al.

(10) Patent No.: US 7,626,697 B2
(45) Date of Patent: Dec. 1, 2009

(54) GRATING PHOTOMETER

(75) Inventors: Jinhong Qiu, Shenzhen (CN); Chao Zeng, Shenzhen (CN); Jing Cao, Shenzhen (CN)

(73) Assignee: Shenzhen Mindray Bio-Medical Electronics Co., Ltd. (CN)

( * ) Notice: Subject to any disclaimer, the term of this patent is extended or adjusted under 35 U.S.C. 154(b) by 0 days.

(21) Appl. No.: 11/855,080

(22) Filed: Sep. 13, 2007

(65) Prior Publication Data

US 2008/0068598 A1 Mar. 20, 2008

(30) Foreign Application Priority Data

Sep. 15, 2006 (CN) .................... 2006 2 0014767 U

(51) Int. Cl.
*G01J 3/28* (2006.01)
(52) U.S. Cl. ..................................... 356/328
(58) Field of Classification Search ................ 356/233, 356/328, 334, 330, 326
See application file for complete search history.

(56) References Cited

U.S. PATENT DOCUMENTS

| | | | | |
|---|---|---|---|---|
| 3,688,584 A | * | 9/1972 | Stone et al. ................ 73/382 R |
| 4,381,150 A | * | 4/1983 | Curtis ......................... 356/247 |
| 5,675,411 A | * | 10/1997 | Brooks et al. ............... 356/328 |
| 5,986,723 A | * | 11/1999 | Nakamura et al. ............ 349/39 |
| 6,473,169 B1 | * | 10/2002 | Dawley et al. ........... 356/239.4 |
| 2007/0181800 A1 | * | 8/2007 | Jolliffe et al. ................ 250/288 |

FOREIGN PATENT DOCUMENTS

| | | |
|---|---|---|
| CN | 2612934 | 4/2004 |
| CN | 1808099 | 7/2006 |
| CN | 2867340 | 2/2007 |
| JP | 54-123085 | 9/1979 |

OTHER PUBLICATIONS

China patent application No. 200620014767.0, International Search Report dated Aug. 8, 2007 (no translation).

\* cited by examiner

*Primary Examiner*—Gregory J Toatley, Jr.
*Assistant Examiner*—Abdullahi Nur
(74) *Attorney, Agent, or Firm*—Vista IP Law Group, LLP.

(57) ABSTRACT

The present invention provides a grating photometer comprising a light splitting box, a preamplifier box, a photodiode array and optical assembly. The light splitting box has a light splitting chamber. There are provided a first extinction hole and second extinction hole respectively on the side wall of the light splitting chamber and on the preamplifier box to correspond to zero order spectrum line. The first hole is a through hole and the second hole is a blind hole. The configuration of the first and second extinction holes direct the zero order spectrum to go into the second extinction hole, as a result, generates a rather small number of stray light in the light splitting chamber coming from the scattering of the zero order spectrum from the second extinction hole, thus suppresses effectively the stray light and improves the signal-to-noise ratio of the photometer.

8 Claims, 4 Drawing Sheets

I # GRATING PHOTOMETER

STATEMENT OF RELATED APPLICATION

The present application claims priority of the Chinese Patent Application No. 200620014767.0, entitled "A Grating Photometer", filed on Sep. 15, 2006, which is incorporated herein by reference in its entirety.

FIELD OF THE INVENTION

The present invention relates to a gracing photometer, and specifically to an extinction structure for the grad photometer.

BACKGROUND OF THE INVENTION

A photometer is the key of a automatic biochemical analyzer, which is required to have high accuracy and wide linear range. In a photometric measurement system, the stray light is one of the main factors that influence accuracy and linearity of absorbance, so the stray light must be reduced to an extent small enough. In a grating dispersing optical system, the zero order spectrum corresponds to the ray whose order of spectrum is zero Since the zero order spectrum is non-dispersive, that is, it integrates the zero order spectral energy of all wavelengths the zero order spectral energy takes up a relatively large proportion of the total incident energy. This portion of ray whose order of spectrum is zero is reflected and scattered in the apparatus to form the stray light, therefore forming an interfering background at the position of detecting a spectral signal and reducing the signal-to-noise ratio and analytical sensitivity of the apparatus.

In order to eliminate the stray light caused by the reflection and scattering of the zero order spectrum, the following solutions are generally employed: 1) utilizing a concave grating to minimize the number of optical elements ill a light splitting chamber, thus reducing the stray light generated by scattering at the optical surface; 2) blackening the components in the light splitting chamber by spraying a black extinction paint over the vessel surface that generates the stray light or coating the vessel surface with a black cotton flannel. However, these two methods can not suppress sufficiently the stray light generated by the zero order spectrum.

SUMMARY OF THE INVENTION

To overcome the shortcomings in prior art, the present invention provides a grating photometer which is capable of suppressing sufficiently stray light generated by zero order spectrum line and improving a signal-to-noise ratio. In order to realize this goal the following technical solutions are adopted in the present invention.

According to an embodiment of the present invention, there is provided a grating photometer, comprising a light splitting box having a light splitting chamber; a preamplifier box which is mounted on a side wall of the light splitting chamber; a photodiode array which is mounted in the preamplifier box; and arm optical assembly which is mounted in the light splitting box, wherein a first ejection hole and a second extinction hole are provided respectively on the side wall of the light splitting chamber and on the preamplifier box respectively which correspond to the position of the zero order spectrum line. The first extinction hole is a through hole, while the second extinction hole is a blind hole.

There is further provided a sealing gasket between the side wall of the light splitting chamber and the preamplifier box. A through hole is provided on the sealing gasket to connect the first ejection hole and the second extinction hole.

According to the grating photometer of the embodiment of the present invention, the first extinction hole may be coaxial or non-coaxial with the second extinction hole. Preferably, the first and second extinction holes are circular; alternatively, the first and second extinction holes are square or other shapes.

According to the grating photometer of the embodiment of the present invention, the aperture of the first extinction hole, the aperture of the second extinction hole and the aperture of the through hole on the sealing gasket may be same or different.

The benefits of the present invention are as follows: the configuration of the first and the second extinction holes directs the zero order spectrum to go into the second extinction hole, as a result generates a rather small number of stay light in the light splitting chamber coming from the spectrum of the zero order spectrum from the second extinction on hole, thus suppresses effectively the stray light and improves the signal-to-noise ratio of the photometer.

DETAILED DESCRIPTION OF THE INVENTION

Figure 1:
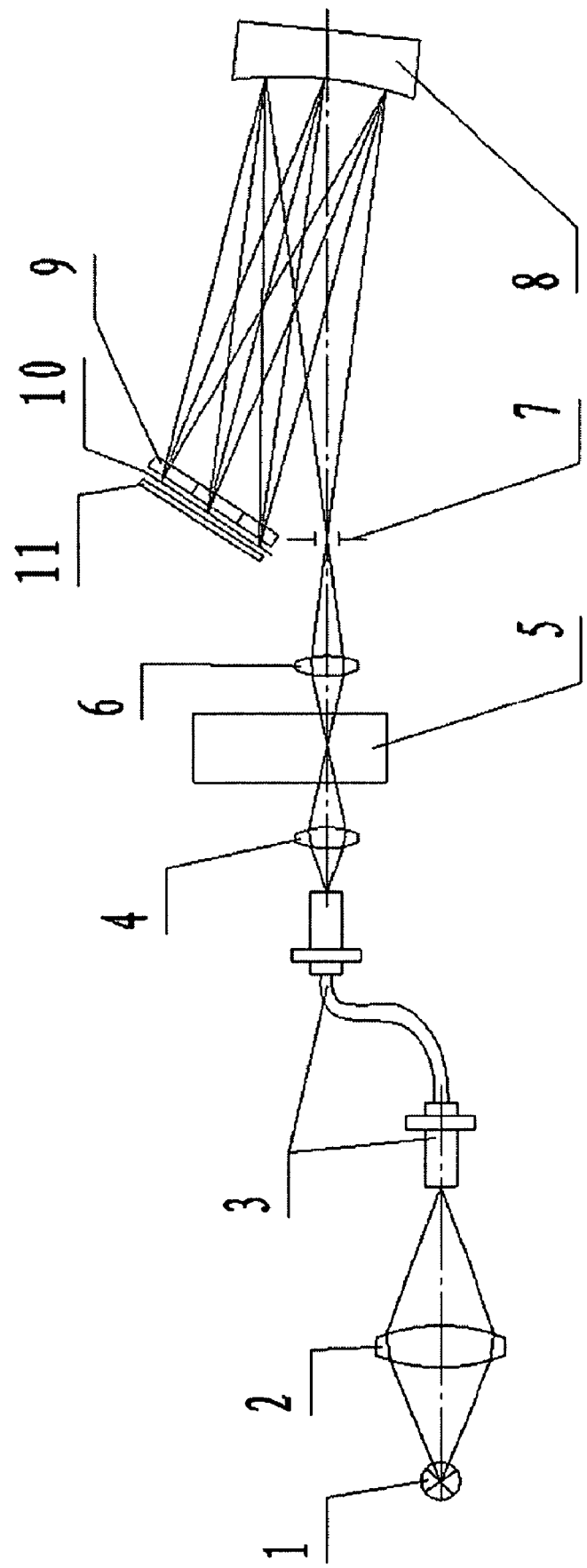
FIG. 1 is a schematic diagram showing a optical system of a grating photometer.
Figure 2:
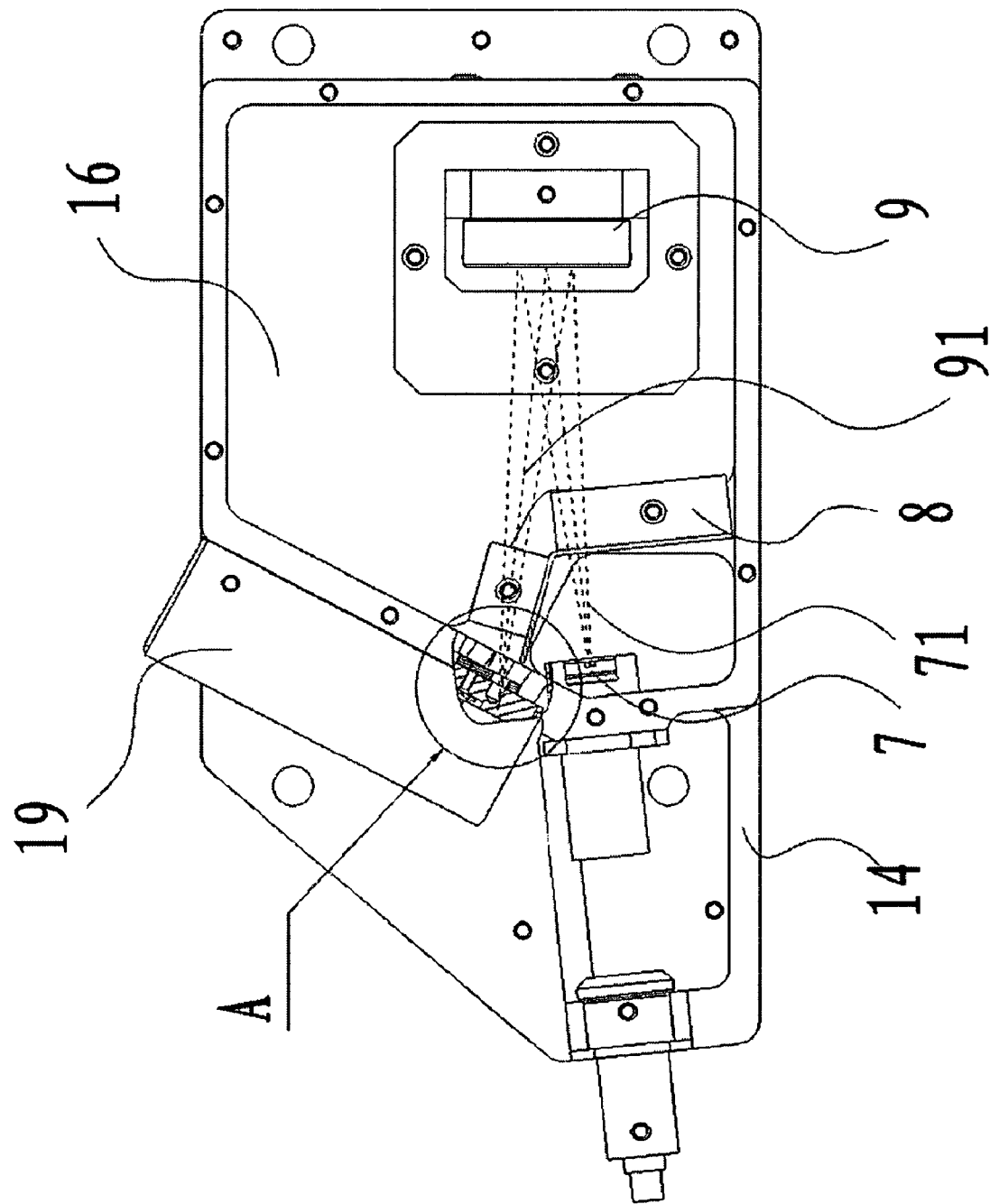
FIG. 2 is a structural diagram of a grating photometer according to an embodiment of the present invention.
Figure 3:
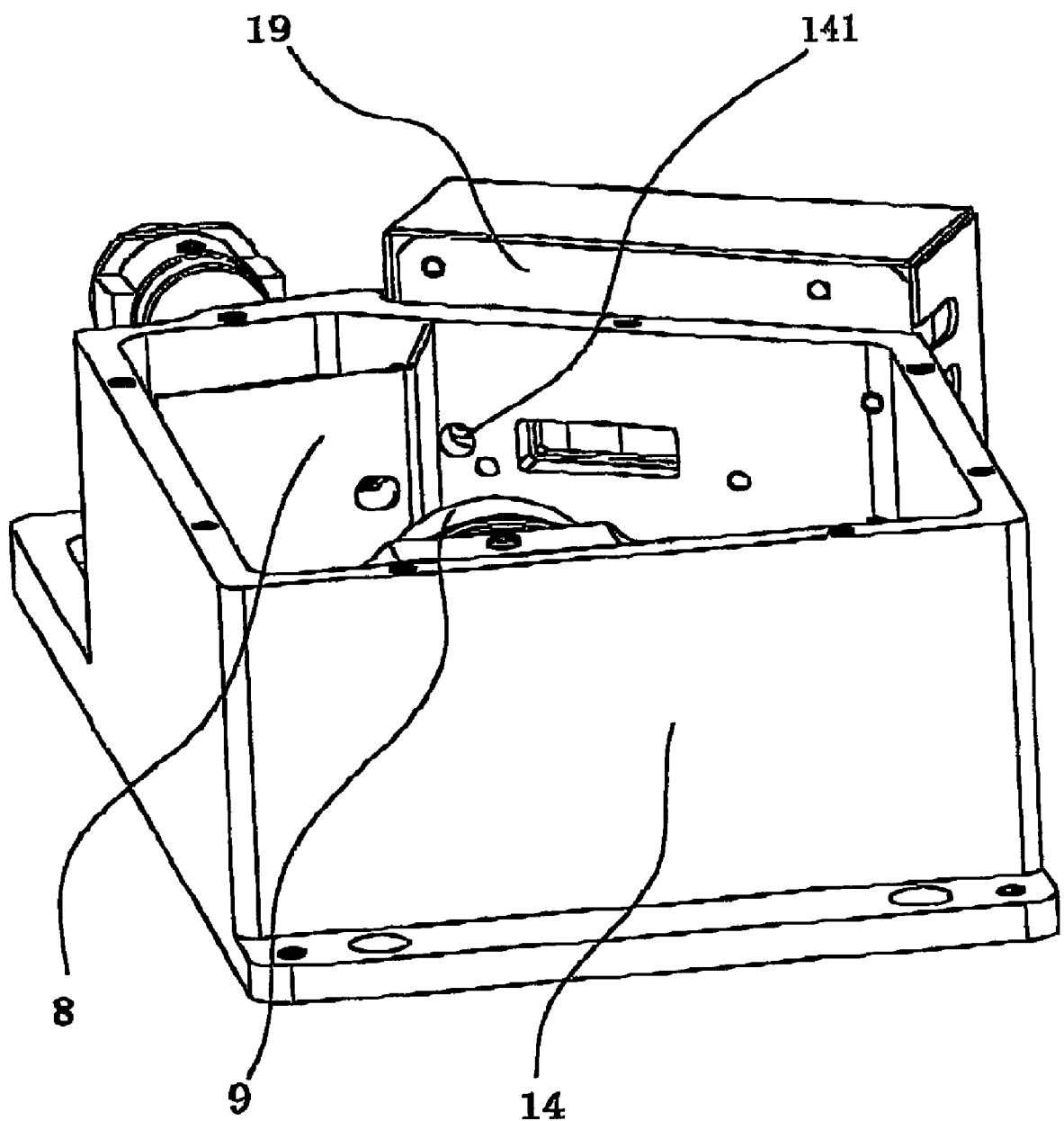
FIG. 3 shows a profile of the grating photometer according to all embodiment of the present invention.

Referring to FIG. 1 to FIG. 3, a grating photometer according to an embodiment of the present invention comprises a light splitting box 14, a preamplifier box 19, a photodiode array 12 and are optical assembly. The light splitting box 14 is a sealed box including a light splitting chamber 16. The preamplifier box 19, also a sealed box, is mounted on a side wall of the light splitting chamber 16. The optical assembly is mounted in the light splitting box 14, and the photodiode array 12 is configured in the preamplifier box 19. The optical assembly comprises a light source 1, a first lens 2, an optic fiber bundle 3, a second lens 4, a cuvette 5, a third lens 6, an entrance slit 7, a diaphragm 8 and a concave, flat-field grating 9. The diaphragm 8 compares to form the light splitting chamber 16. The light emitted from the light source 1 is converged via the first lens 2 into the incident end of the optic fiber bundle 3, and, go though the exit end of the optic fiber bundle 3, then converged by the second lens 4, passes through the cuvette 5 and finally gets converged into the entrance slit 7 via the third lens 6. The light beam passing through the entrance slit 7 is restricted by the diaphragm 8 and incident on the concave, flat-field grating 9 which is provided in the light splitting chamber 16. The light beam is diffracted and converged by the grating 9, so the entrance slit is imaged on a slit array 11 behind a band-pass filter 10 (the slit array 11 is mounted in the preamplifier box 19). The detected spectrum is selected by each slit in the slit array 11 and received by the photodiode array 12 behind the slit array 11.

Figure 4:
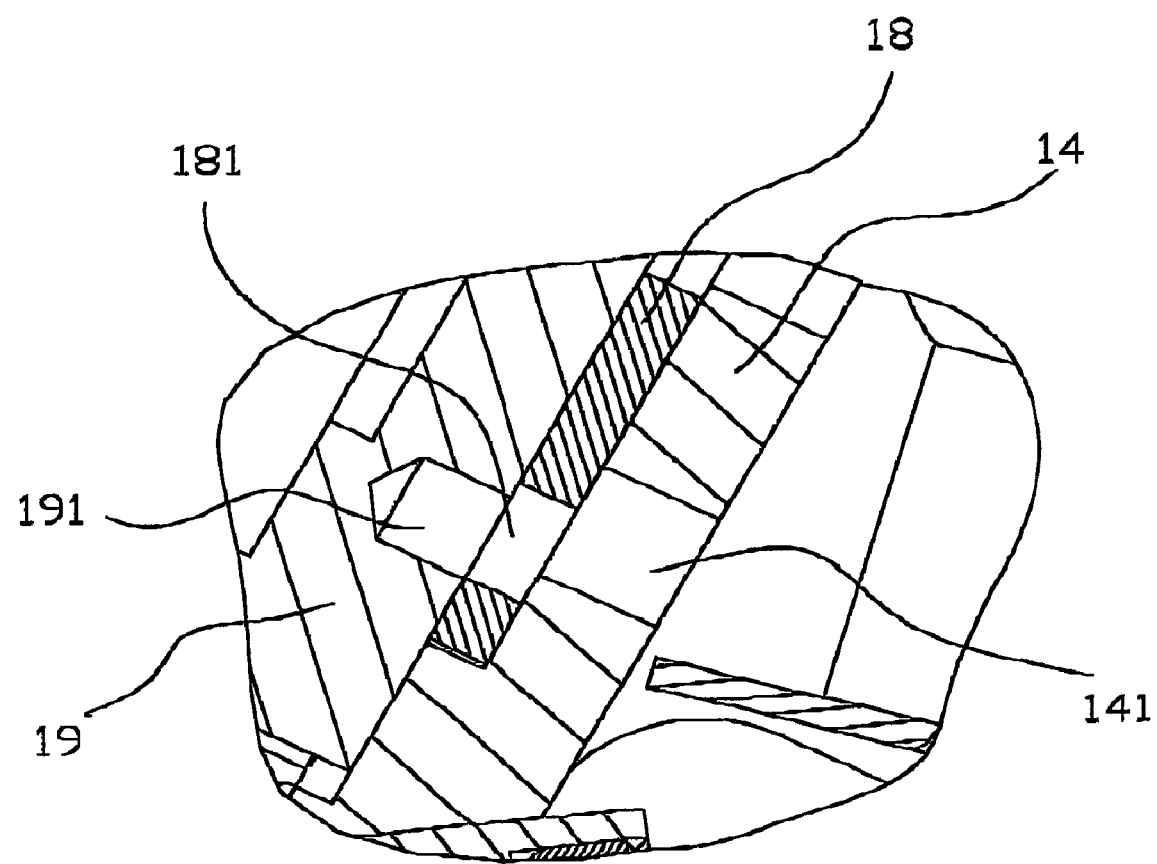
FIG. 4 shows an enlarged portion A of FIG. 2.

As shown in FIGS. 3 and 4, there is provided a first emotion hole 141 at a place on the side wall of the light splitting chamber 16 which corresponds to the position of the zero order spectrum line, and a second exaction hole 191 at a place on the preamplifier box 19 which also corresponds to the position of the zero order spectrum line. The first extinction hole 141 is a through hole and the second extinction hole 191 is a blind hole. Additionally, there is provided a sealing gasket 18 between the preamplifier box 19 and the light splitting box 14. In the sealing gasket 18, there is also provided a through hole 181 which connects the first extinction hole 141 and the second extinction hole 191.

In this embodiment, the first and second extinction holes 141 aid 191 may be circular, square or other shapes. The first extinction hole 141 may be coaxial or non-coaxial with the second extinction hole 191, as long as the zero order spectrum line can enter in them to obtain the same effect. Preferably, the first extinction hole 141 is not aligned with the second extinction bole 191, as shown in FIG. 4. Additionally, the aperture of the first extinction hole 141, the aperture of the second extinction hole 191 and the aperture of the through hole 181 on the sealing gasket may be same or different.

In this embodiment, since the first extinction hole 141 is provided on the light splitting box 14 to correspond to the position of the zero order spectrum line, the zero order spectrum line can enter in the first extinction hole 141 and passes through the through hole 181 of the sealing gasket to enter in the second extinction hole 191 on the preamplifier box. Therefore, the zero order spectrum line having traveled into the second extinction hole 191 generates a rather small number of stray light in the light splitting chamber 16, thus the stray light caused by the zero order spectrum line has been suppressed effectively.

It is to be understood that though the present invention has been described in details by way of above-mentioned specific preferred embodiments, these embodiments are illustrative only. For a person skilled in the art, some simple inference or substitution can be made without departing from the spirit of the present invention, and should be regarded as within the protection scope of the present invention defined by the attached claims.

The invention claimed is:

1. A grating photometer, comprising:
a light splitting box comprising a light splitting chamber;
a preamplifier box;
a photodiode array being mounted in the preamplifier box; and
an optical assembly being attached to the light splitting box, wherein
a first extinction hole defining a first aperture and a second extinction hole defining a second aperture are provided respectively on or in the light splitting chamber and on or in the preamplifier box to correspond to a position of zero order spectrum line of a zero order spectrum,
the first extinction hole being a through hole,
the second extinction hole being a blind hole, and
the first extinction hole and the second extinction hole are configured to reduce scattering from the zero order spectrum.

2. The grating photometer according to claim 1, further comprising a sealing gasket between the light splitting chamber and the preamplifier box, the sealing gasket comprising a through hole to align the first extinction hole and the second extinction hole.

3. The grating photometer according to claim 1, wherein the first extinction hole is coaxial with the second extinction hole.

4. The grating photometer according to claim 1, wherein the first extinction hole is non-coaxial with the second extinction hole.

5. The grating photometer according to claim 1, wherein the first and second extinction boles are circular.

6. The grating photometer according to claim 1, wherein the first and second extinction holes are square or other shapes.

7. The grating photometer according to claim 1, wherein the first aperture of the first extinction hole and the second aperture of the second extinction hole may be same or different.

8. The grating photometer according to claim 2, wherein the first aperture of the first extinction hole, the second aperture of the second extinction hole and a third aperture of the through hole on the sealing gasket may be same or different.

* * * * *